United States Patent
Harden et al.

(10) Patent No.: US 11,611,802 B2
(45) Date of Patent: *Mar. 21, 2023

(54) SYSTEMS AND METHODS FOR OPTIMIZED DISCOVERY OF FRESH CONTENT IN A DYNAMIC INTERACTIVE GUIDE

(71) Applicant: Rovi Guides, Inc., San Jose, CA (US)

(72) Inventors: Benjamin Harden, Coronado, CA (US); Walter John Schmidt, Dallas, TX (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,777

(22) Filed: Feb. 25, 2021

(65) Prior Publication Data

US 2021/0274252 A1    Sep. 2, 2021

Related U.S. Application Data

(63) Continuation of application No. 16/439,394, filed on Jun. 12, 2019, now Pat. No. 10,965,988.

(51) Int. Cl.
*H04N 21/454* (2011.01)
*H04N 21/45* (2011.01)
*H04N 21/431* (2011.01)
*H04N 21/482* (2011.01)

(52) U.S. Cl.
CPC ....... *H04N 21/454* (2013.01); *H04N 21/4312* (2013.01); *H04N 21/4532* (2013.01); *H04N 21/4821* (2013.01)

(58) Field of Classification Search
CPC ............. H04N 21/454; H04N 21/4312; H04N 21/4532; H04N 21/4821
See application file for complete search history.

(56) References Cited

U.S. PATENT DOCUMENTS

| | | |
|---|---|---|
| 8,793,729 B2 | 7/2014 | Adimatyam et al. |
| 9,948,989 B1 | 4/2018 | Hannum et al. |
| 2005/0160461 A1 | 7/2005 | Baumgartner et al. |
| 2008/0005766 A1 | 1/2008 | Ostrowska et al. |
| 2009/0019481 A1 | 1/2009 | White |
| 2009/0165045 A1 | 6/2009 | Stallings et al. |
| 2010/0333139 A1 | 12/2010 | Busse et al. |

(Continued)

*Primary Examiner* — Jefferey F Harold
*Assistant Examiner* — Alexander Boyd
(74) *Attorney, Agent, or Firm* — Haley Guiliano LLP (57) ABSTRACT

Methods and systems for facilitating discovery of fresh content in a grid guide are described herein. The system generates for display a grid guide with a first set of content identifiers populating the grid guide. The system receives an input to shift the grid guide and, in response, identifies a second set of content identifiers that would populate the grid guide following the shift. The system determines duplicative content identifiers between the first and second sets of content identifiers. The system then removes the duplicative content identifiers or highlights the non-duplicative content identifiers in order to emphasize fresh content in the grid guide. The system may additionally add identifiers to the content identifiers to indicate recorded or previously watched content and may collapse the grid guide if there are blank rows or columns. These methods and systems provide the user with easier access to fresh content in the grid guide.

10 Claims, 10 Drawing Sheets

(56) References Cited

U.S. PATENT DOCUMENTS

2011/0102675 A1   5/2011  Jackson
2014/0006951 A1   1/2014  Hunter
2016/0066042 A1   3/2016  Dimov et al.
2016/0142783 A1*  5/2016  Bagga ................ H04N 21/4532
                                                          725/47

* cited by examiner

102 ⟶                                                            100

| | 10:00 | 11:00 | 12:00 | 1:00 |
|---|---|---|---|---|
| HBO | Batman | | Star Wars Episode IV | |
| HBOW | Aquaman | The Hangover | | Batman |
| HBO Family | Bewitched | The Mule | | |
| HBO East | The Goonies | | The Patriot | |
| Showtime | The Grinch | Back to the Future | | Suits |
| Showtime | The Patriot | | | Inside NFL |

104 ⟶

| | 2:00 | 3:00 | 4:00 | 5:00 |
|---|---|---|---|---|
| HBO | The Goonies | | The Hangover | |
| HBOW | Forest Gump | The Mule | | Jaws |
| HBO Family | Inside NFL | The Goonies | | |
| HBO East | Aquaman | | The Hangover | |
| Showtime | Gilmore Girls | Back to the Future | | The Grinch |
| Showtime | Suits | | | Second Act |

106 ⟶

| | 2:00 | 3:00 | 4:00 | 5:00 |
|---|---|---|---|---|
| HBO | | | | |
| HBOW | Forest Gump | | | Jaws |
| HBO Family | | | | |
| HBO East | | | | |
| Showtime | Gilmore Girls | | | |
| Showtime | | | | Second Act |

108 ⟶

| | 2:00 | 5:00 |
|---|---|---|
| HBOW | Forest Gump | Jaws |
| Showtime | Gilmore Girls | |
| Showtime | | Second Act |

|  | 10:00 | 11:00 | 12:00 | 1:00 |
|---|---|---|---|---|
| HBO | Batman | | Star Wars Episode IV | |
| HBOW | Aquaman | The Hangover | | Batman |
| HBO Family | Bewitched | The Mule | | |
| HBO East | The Goonies | | The Patriot | |
| Showtime | The Grinch | Back to the Future | | Suits |
| Showtime | The Patriot | | | Inside NFL |

⇩

204

|  | 2:00 | 3:00 | 4:00 | 5:00 |
|---|---|---|---|---|
| HBO | The Goonies | | The Hangover | |
| HBOW | Forest Gump | The Mule | | Jaws |
| HBO Family | Inside NFL | The Goonies | | |
| HBO East | Aquaman | | The Hangover | |
| Showtime | Gilmore Girls | Back to the Future | | The Grinch |
| Showtime | Suits | | | Second Act |

⇩

206                                                             208

|  | 2:00 | 3:00 | 4:00 | 5:00 |
|---|---|---|---|---|
| HBO | The Goonies | | The Hangover | |
| HBOW | Forest Gump | The Mule | | Jaws  |
| HBO Family | Inside NFL | The Goonies | | |
| HBO East | Aquaman | | The Hangover | |
| Showtime | Gilmore Girls  | Back to the Future | | The Grinch |
| Showtime | Suits | | | Second Act |

SYSTEMS AND METHODS FOR OPTIMIZED DISCOVERY OF FRESH CONTENT IN A DYNAMIC INTERACTIVE GUIDE

CROSS REFERENCE TO RELATED APPLICATIONS

This application is a continuation of U.S. patent application Ser. No. 16/439,394, filed Jun. 12, 2019, the disclosure of which is hereby incorporated by reference herein in its entirety.

BACKGROUND

The present disclosure is directed to interactive guide systems and, more particularly, to interactive guide systems that provide optimized content to users.

SUMMARY

Users view interactive guides not only to search for specific content items but also to discover new content. Current grid guides contain a large number of content items that the user must sort through when searching for new content of interest. These grid guides may list many content sources along one axis, with a number of content items available from each source. As a user navigates through the grid guide, the user scrolls past content items that are not of interest, only to encounter those content items at another point in the grid guide. Additionally, if the user exits the grid guide and returns shortly thereafter, the user may again be presented with content items that the user has already seen and decided against. The user must visually sort through all of the content items again in order to rule out previously presented content and identify fresh content of interest. In the process of scanning through the content, the user may fail to notice a fresh content item among the previously presented content. Current grid guides therefore clutter the user's screen with content that the user has already passed over, thereby hindering the user's ability to discover fresh content items of interest.

Solutions to the problem described above include providing a grid guide that facilitates the discovery of fresh content without bogging the user down with content the user has already seen. For example, the grid guide can draw the user's attention to fresh content in the grid guide. In some embodiments, once a user decides that they are not interested in a content item and has scrolled past that content item in the grid guide, the system can prevent the user from seeing that content item again in the grid guide. In some embodiments, the system can highlight content items that the user has not yet seen in the grid guide to provide a better navigational experience for the user while searching for new content.

There are several techniques that can be used to facilitate the discovery of fresh content in a grid guide in accordance with the disclosure. For example, methods and systems described herein can compare content identifiers on each page that a user navigates to within the grid guide to the content identifiers that the user has already seen. If there are any duplicate content identifiers, the system may remove them from being displayed in the grid guide. Additionally, once the system has removed a number of content identifiers from a page in the grid guide, there may be blank rows or columns in the guide. In order to more efficiently use the space on the user's screen, the system may collapse the grid guide to hide the empty rows or columns on that page. This allows the system to display more fresh content to the user on a single page.

Additionally or alternatively, the system may change a display characteristic of the fresh content identifiers in the grid guide so that they stand out from content identifiers that the user has already seen. For example, the system may highlight the fresh content identifiers by increasing the brightness values, changing the color, or increasing the text size. In some embodiments, the display characteristic may be a graphic icon of a content identifier. For example, the system may add word art or an image (e.g., a star, a tomato, etc.) to the content identifier to distinguish content that the user has already seen from fresh content. Additionally or alternatively, the system may change a display aspect of the content identifiers that the user has already seen. For example, the system may decrease the brightness values, change the color, or decrease the text size. These changes to the fresh content identifiers and/or the old content identifiers help the user to identify fresh content to watch without removing any content identifiers from the grid guide.

In some embodiments, the system checks a database of content that has been recorded by the user. If any of the content identifiers match the content identifiers of recorded content, the system may change a display aspect of the matching content identifiers in the grid guide. For example, the system may add an indicator to the content identifier. Additionally or alternatively, the system may highlight the content identifier for the recorded content by increasing the brightness values, changing the color, or increasing the text size.

In some embodiments, the system checks a database of content that the user has previously watched or consumed. If any of the content identifiers match the content identifiers of previously watched or consumed content, the system may remove the matching content identifier from the grid guide.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for highlighting fresh content in a grid guide. The grid guide may include audio content, visual content, video content, multimedia content, or any other type of content. As a user navigates through the grid guide, the system may remove duplicative content identifiers so that the user sees only fresh content identifiers. In some embodiments, the system changes a display characteristic of duplicative or non-duplicative content identifiers. The system may further add an indicator to any content identifier corresponding to recorded content. The system may also remove or modify a display characteristic of any content identifier corresponding to previously consumed content.

Figure 1:
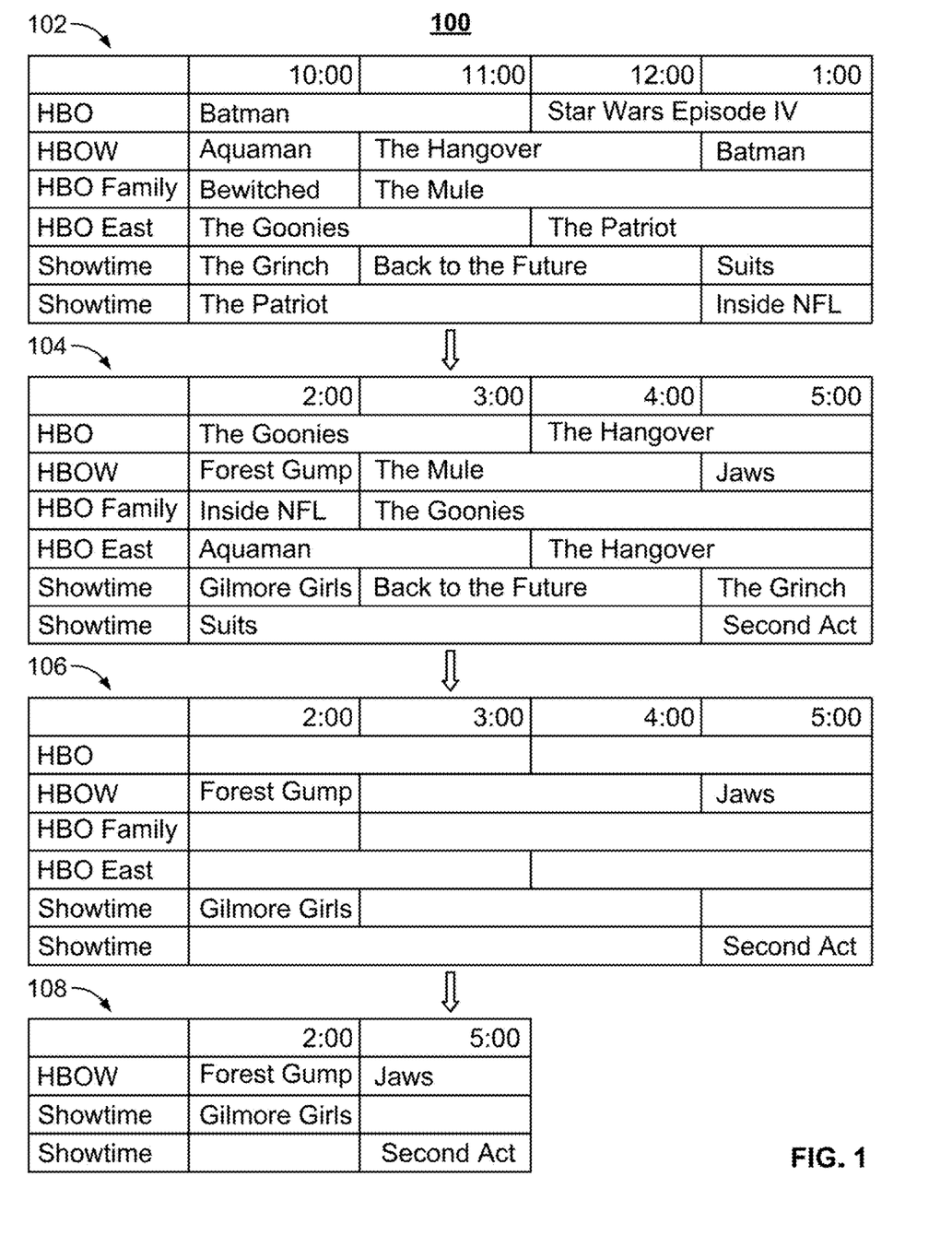
FIG. 1 shows the removal of duplicative content identifiers from a grid guide and the collapse of the grid guide, in accordance with some embodiments of the disclosure.

FIG. 1 shows the removal of duplicative content identifiers from a grid guide and the collapse of the grid guide, in accordance with some embodiments of the disclosure. In process 100, window 102 shows an illustrative grid guide with two axes. The vertical axis lists content sources (e.g., HBO, HBOW, etc.) and the horizontal axis shows time periods. As shown, the time periods span from 10:00 to 2:00. Content identifiers corresponding to various content items from the content sources populate the grid guide.

The grid guide of window 102 shows only a portion of the available content of the system. For example, content may be available from additional content sources not currently shown in window 102. As another example, content may be available in other time periods. Accordingly, the user is able to navigate the grid guide of window 102 to view additional content items (e.g., by swiping the display screen or using directional keys). Window 104 of FIG. 1 shows an illustrative grid guide shifted in time relative to the grid guide of window 102. A user may be able to access the grid guide of window 104 by swiping the grid guide of window 102 to the left. The time periods of the grid guide in window 104 span from 2:00 to 6:00, and content identifiers corresponding to these time periods populate the grid. As shown, the grid guides of windows 102 and 104 include duplicative content identifiers (e.g., "The Goonies," "The Hangover," etc.). In accordance with the present disclosure, the system can optimize the grid guide to remove duplicate content identifiers previously displayed. To do this, the system determines whether any of the content identifiers in window 104 were previously displayed (e.g., in the grid guide of window 102). In the example shown in FIG. 1, the system determines that every content identifier except "Forrest Gump," "Jaws," "Gilmore Girls," and "Second Act" was previously displayed to the user in the grid guide. The system then removes the content identifiers that have been previously displayed from the grid guide to provide an optimized display.

In some embodiments, the system may display the optimized grid guide of window 106, which is similar to the grid guide of window 104, but without the duplicative content identifiers. This enables a user to easily identify fresh content. As shown, there are a significant number of blank cells in the grid guide, including entire blank rows and columns. In some embodiments, the system further optimizes the grid guide by identifying and removing blank columns and/or blank rows to more efficiently present information to the user. For example, the system may collapse the grid guide to hide any blank rows or columns. Window 108 shows the resulting grid guide after the system has collapsed the blank rows and columns. In some embodiments, this collapsing feature may allow the grid guide to include more information, such as rows or columns which otherwise would not have fit in the window. For example, in the grid guide of window 108, the system may be able to include content identifiers in later time slots such as 6:00 and 7:00, as well as content identifiers from additional content sources. Additionally or alternatively, the collapsed grid guide may expand in size to fill the entire window on a media device.

Figure 2:
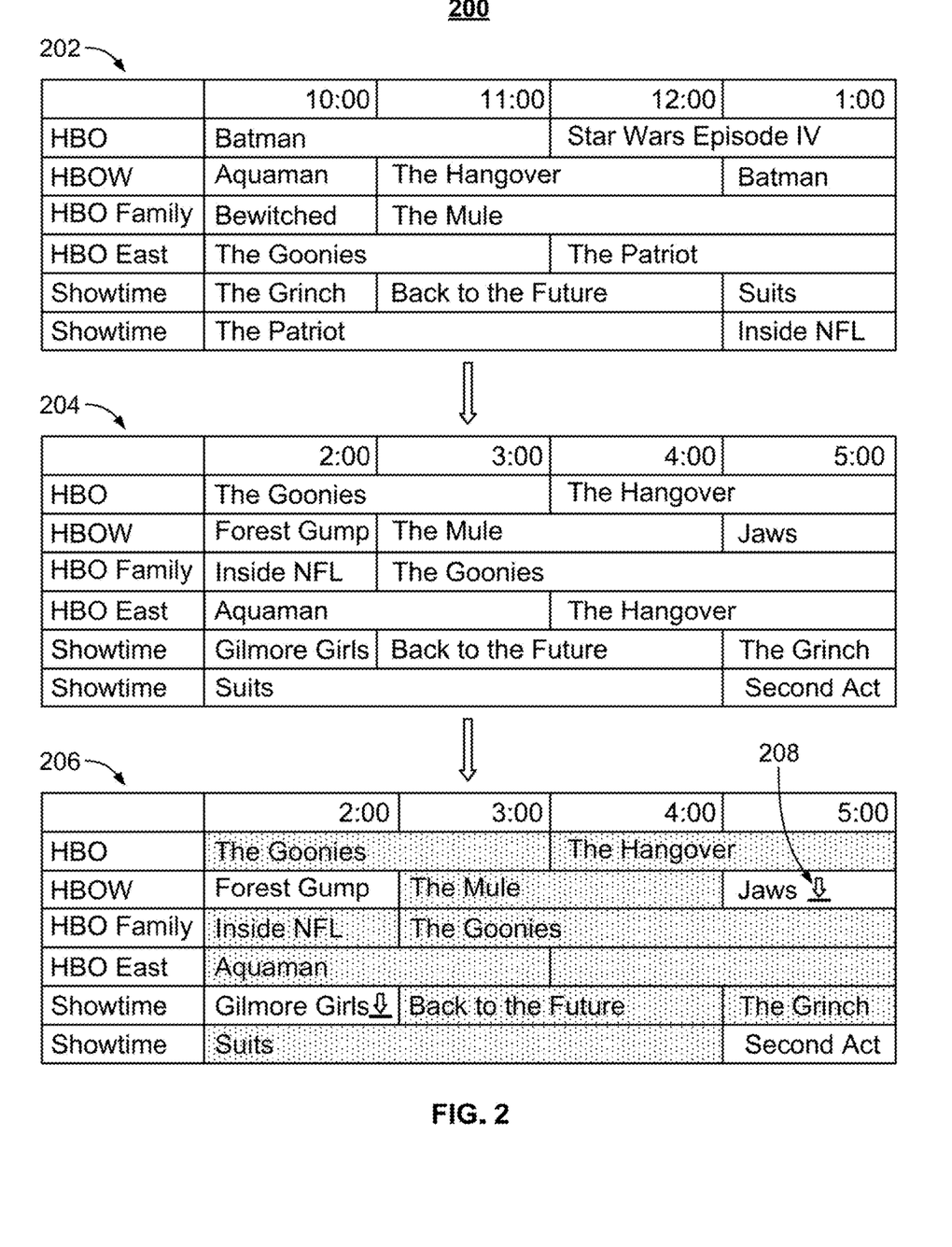
FIG. 2 shows displaying duplicative and non-duplicative content identifiers using different display characteristics and displaying an indicator for content identifiers of recorded content, in accordance with some embodiments of the disclosure.

While FIG. 1 illustrates methods and systems for optimizing a grid guide by removing identifiers, other techniques may be used to draw the user's attention to fresh content. For example, FIG. 2 shows displaying duplicative and non-duplicative content identifiers using different display characteristics and displaying an indicator for content identifiers of recorded content. Windows 202 and 204 of FIG. 2 correspond to windows 102 and 104 of FIG. 1. In process 200, the system may determine whether any of the content identifiers in the grid guide of window 204 have been previously displayed (e.g., in the grid guide of window 202). The system determines that every content identifier except for Forrest Gump, Jaws, Gilmore Girls, and Second Act was previously displayed to the user in the grid guide. The system therefore modifies the display characteristics of the content identifiers to highlight the non-duplicative content identifiers without removing the duplicative content identifiers.

In some embodiments, the system modifies a value of a display characteristic of the duplicative content identifiers. For example, the system may change the cell color or the duplicative content identifiers to a darker color or may decrease the brightness of the duplicative content identifiers. For example, in the grid guide of window 206, the cells of the duplicative content identifiers are a darker color than the non-duplicative content identifiers. Additionally or alternatively, the system may decrease the text size of the duplicative content identifiers within the grid guide. In some embodiments, the system may decrease the opacity of the duplicative content identifiers so that a background image of the display screen is visible through the duplicative content identifiers. In some embodiments, the display characteristic may be a graphic icon of a content identifier. For example, the system may add word art to the content identifier. In another example, the system may add an image (e.g., a tomato) to the content identifier to indicate duplicative content. The system may change any other display characteristic of the duplicative content identifiers in order to highlight the non-duplicative content identifiers.

In some embodiments, the system modifies a value of a display characteristic of the non-duplicative content identifiers. For example, the system may change the color of the non-duplicative content identifiers to a lighter or brighter color or may increase the brightness of the non-duplicative content identifiers. For example, in the grid guide of window 206, the system may increase the brightness or change the color of content. In some embodiments, the system may increase the text size of the non-duplicative content identifiers within the grid guide. In some embodiments, if the grid guide has a level of transparency, the system may decrease the transparency of the non-duplicative content identifiers so that a background image of the display screen is not visible through the non-duplicative content identifiers. In some embodiments, the display characteristic may be a graphic icon of a content identifier. For example, the system may add word art to the content identifier. In another example, the system may add an image (e.g., a star) to the content identifier to indicate non-duplicative content. The system may additionally or alternatively change any other display characteristic of the non-duplicative content identifiers in order to highlight the non-duplicative content identifiers.

In some embodiments, the system may determine whether any of the content identifiers correspond to recorded content. For example, the content may be recorded and saved locally on the media device (e.g., storage 408 of FIG. 4) or may be saved externally (e.g., in cloud-based storage). The system may determine whether the metadata of the recorded content matches any of the content identifiers in the grid guide. If there are any matches between recorded content and content identifiers, the system may add an indicator to the content identifier (e.g., indicator 208). It will be understood that in some embodiments, the addition of an indicator to the content identifier takes place before the display is generated. Additionally or alternatively, the system may add an indicator to the content identifier without requiring further user input.

Figure 3:
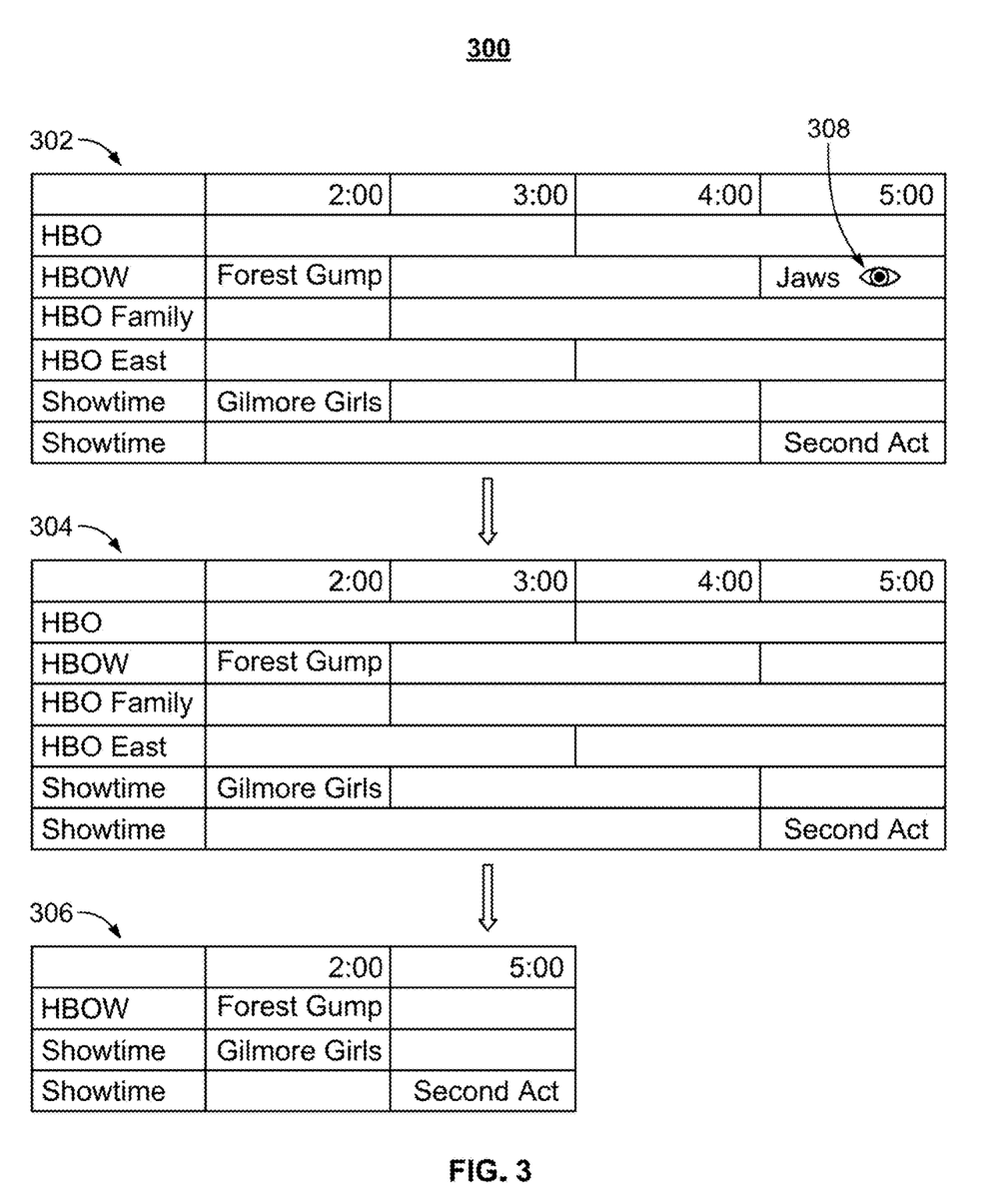
FIG. 3 shows the identification and removal of content identifiers from a grid guide for content that has previously been consumed and the collapse of the grid guide, in accordance with some embodiments of the disclosure.

FIG. 3 shows the identification and removal of content identifiers from a grid guide for content that has previously been consumed. FIG. 3 further illustrates the collapse of the grid guide once the content identifiers corresponding to previously watched content have been removed. In some embodiments, the system in process 300 may determine whether any of the content identifiers correspond to previously watched content. In some embodiments, the content may be audiovisual content (e.g., movies, television shows, etc.), visual content, or audio content (e.g., music, podcasts, etc.). The system may therefore access a history of content that the user has previously consumed. The system may then determine whether the metadata of the previously watched or previously consumed content matches any of the content identifiers in the grid guide. If there is a match, the system may add an indicator to the content identifier. In the example shown in FIG. 3, the grid guide of window 302 corresponds to the grid guide of window 106 in FIG. 1. However, the system has added an indicator 308 to the grid guide of window 302. In some embodiments, the system may remove the content identifier corresponding to the previously consumed content from the grid guide, as shown in the grid guide of window 304. This allows the user to easily identify new, fresh content. In some embodiments, the system further optimizes the grid guide by identifying and removing blank rows and columns to more efficiently present information to the user. The system may then collapse the grid guide to hide any blank columns or rows. Window 306 displays the collapsed grid without the content identifier corresponding to the previously watched or previously consumed content. As in FIG. 1, the system may be able to include content identifiers in later time slots such as 6:00 and 7:00, as well as content identifiers from additional content sources. Additionally or alternatively, the collapsed grid guide may expand in size to fill the entire window on a media device. It will be understood that in some embodiments, the removal of previously watched content takes place before the display is generated. Additionally or alternatively, the system may remove previously watched content without requiring further user input.

It will be understood that the windows of FIGS. 1-3 are shown for illustrative purposes and that not all of the windows need to be displayed. For example, in reference to FIG. 1, the system may display window 102, and then when a user inputs a request to shift the grid guide, the system may directly display window 106 (without displaying window 104) or display window 108 (without displaying windows 104 and 106). Accordingly, it will be understood that in some embodiments, the removal of duplicates takes place before the display is generated. Additionally or alternatively, the system may anticipate a user input to shift the grid guide before receiving the user input. Accordingly, it will be understood that in some embodiments, the system may generate for display the grid guide shifted and comprising only fresh content identifiers prior to receiving the input to shift the grid guide.

Figure 4:
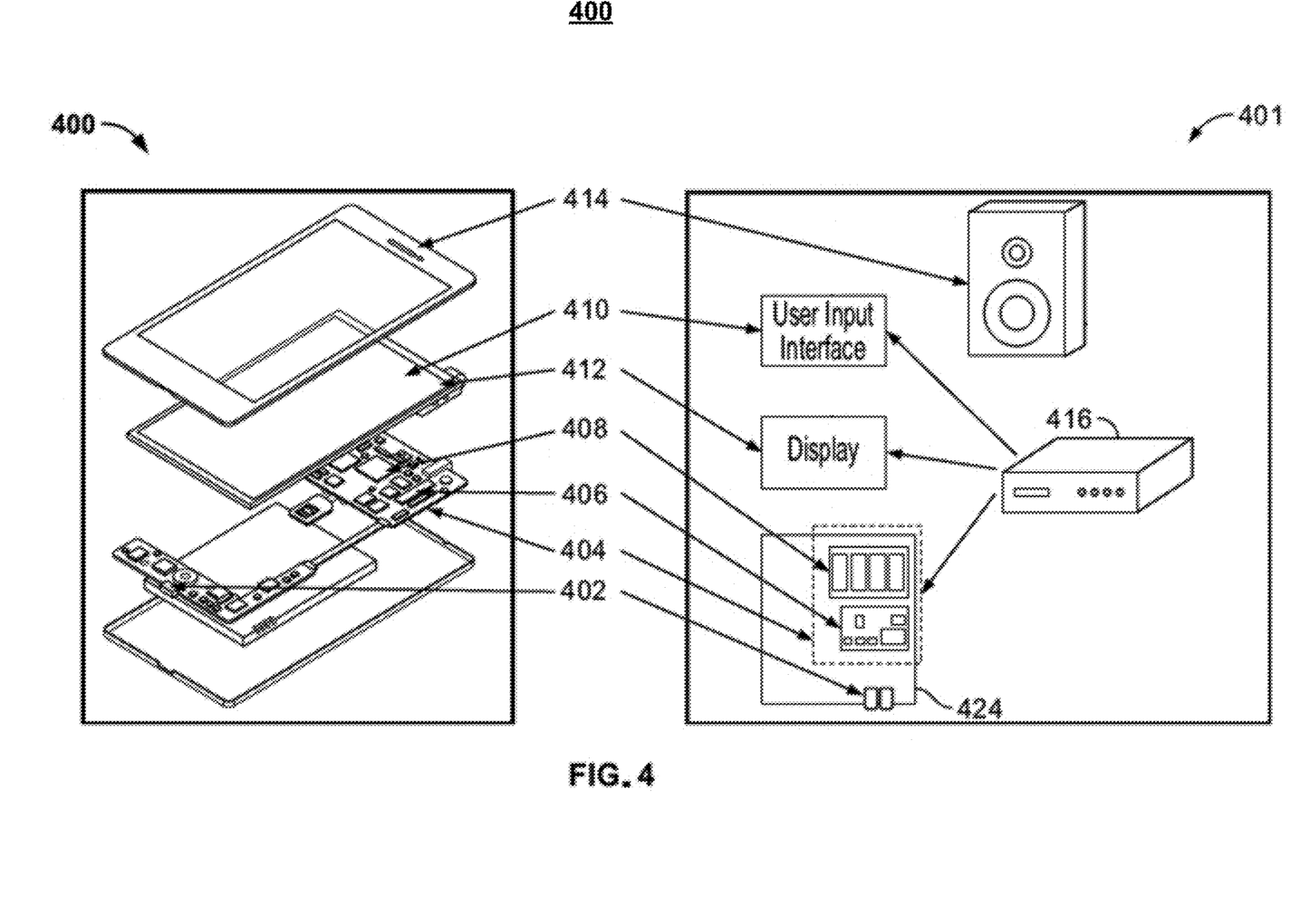
FIG. 4 is a block diagram of an illustrative user equipment, in accordance with some embodiments of the present disclosure.

In some embodiments, the methods and systems described in connection with FIGS. 1-3 utilize a media device on which to display the grid guide to the user. FIG. 4 shows a generalized embodiment of illustrative media devices 400 and 401. As referred to herein, the phrase "media device" should be understood to mean any device that can output a grid guide populated with content identifiers. As depicted, media device 400 may be a smartphone or tablet, whereas media device 401 may be a home media system that includes equipment device 416 (e.g., a set-top box, CPU, video-game console, etc.) powered by processor 424.

Media devices 400 and 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a grid guide stored in memory (i.e., storage 408).

A grid guide may be a stand-alone application implemented on a media device or a server. The grid guide may be implemented as software or a set of executable instructions. The instructions for performing any of the embodiments discussed herein of the grid guide may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 4 the instructions may be stored in storage 408, and executed by control circuitry 404 of media devices 400 and 401.

Figure 5:
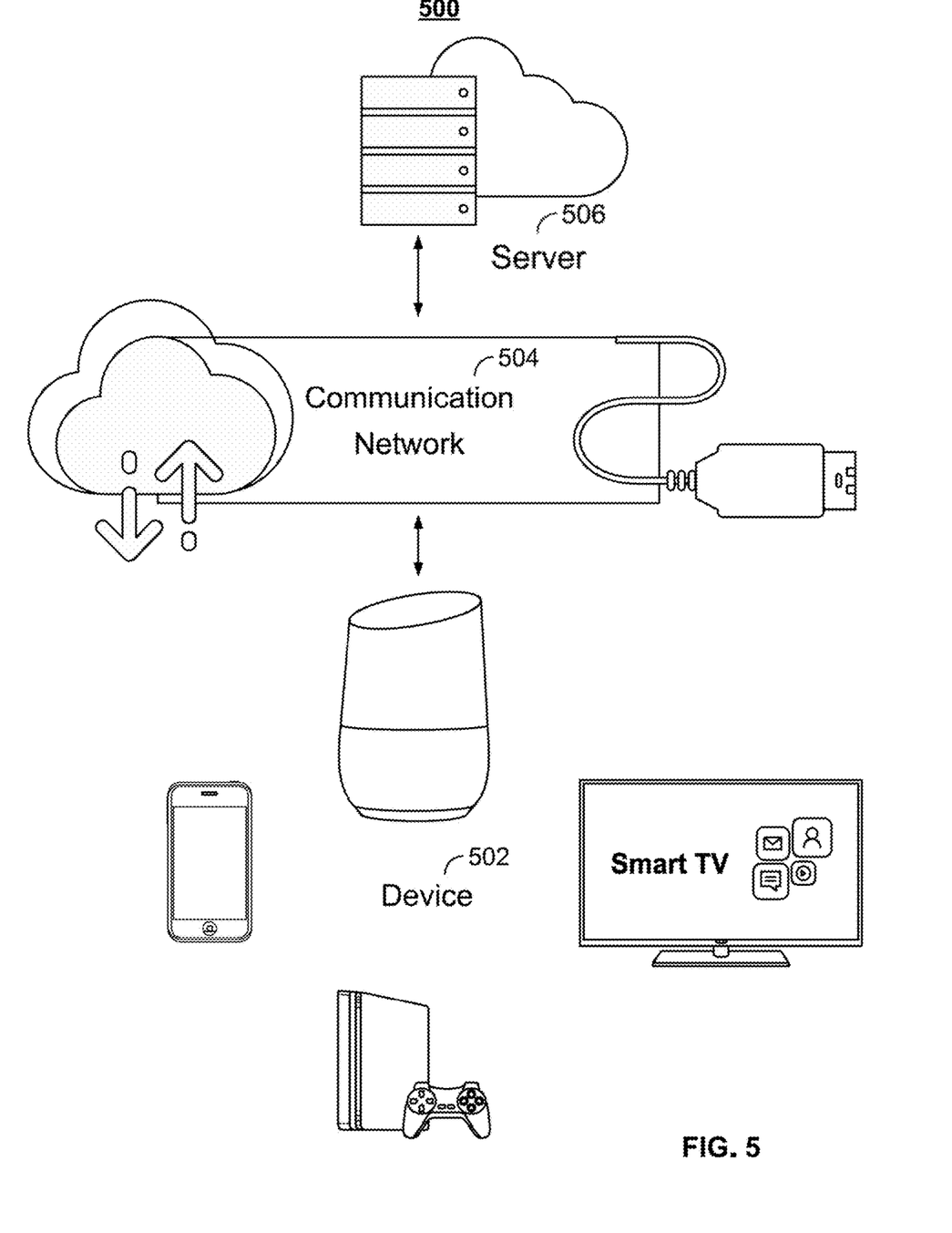
FIG. 5 is a block diagram of an illustrative media system, in accordance with some embodiments of the disclosure.

In some embodiments, a grid guide may be a client-server application where only the client application resides on media devices 400 or 401 (e.g., device 502), and a server application resides on an external server (e.g., server 506). For example, a grid guide may be implemented partially as a client application on control circuitry 404 of media devices 400 or 401 and partially on server 506 as a server application running on control circuitry. Server 506 may be a part of a local area network with media device 502, or may be part of a cloud computing environment accessed via the Internet. In a cloud computing environment, various types of computing services for performing searches on the Internet or informational databases, gathering information for a display (e.g., information for populating a grid guide), or parsing data are provided by a collection of network-accessible computing and storage resources (e.g., server 506), referred to as "the cloud." Media devices 400 and 401 may be cloud clients that rely on the cloud computing capabilities from server 506 to gather data to populate a grid guide. When executed by control circuitry of server 506, the system may instruct the control circuitry to generate the grid guide and transmit the grid guide to media device 502. The client application may instruct control circuitry of the receiving media device 502 to generate the grid guide output. Alternatively, media device 502 may perform all computations locally via control circuitry 404 without relying on server 506.

Control circuitry 404 may include communications circuitry suitable for communicating with a grid guide server or other networks or servers. The instructions for carrying out the above-mentioned functionality may be stored and executed on server 506. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 506) may be used to supplement storage 408 or instead of storage 408.

Control circuitry 404 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the media devices 400 and 401. Circuitry 404 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from media devices 400 and 401, the tuning and encoding circuitry (including multiple tuners) may be associated with storage 408.

A user may send instructions to control circuitry 404 using user input interface 410 of media devices 400 or 401. User input interface 410 may be any suitable user interface touchscreen, touchpad, stylus and may be responsive to external device add-ons such as a remote control, mouse, trackball, keypad, keyboard, joystick, voice recognition interface, or other user input interfaces. User input interface 410 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Speakers 414 may be provided as integrated with other elements of media devices 400 and 401 or may be stand-alone units. Display 412 may be used to display visual content while audio content may be played through speakers 414. In some embodiments, the audio may be distributed to a receiver (not shown), which processes and outputs the audio via speakers 414.

Control circuitry 404 may allow a user to provide user profile information or may automatically compile user profile information. For example, control circuitry 404 may track user preferences and populate the grid guide with channels and/or content that match the user preferences. In some embodiments, control circuitry 404 monitors user inputs that are not queries, such as texts, calls, conversation audio, social media posts, etc., to detect user preferences. Control circuitry 404 may store the user preferences in the user profile. Additionally, control circuitry 404 may obtain all or part of other user profiles that are related to a particular user (e.g., via social media networks), and/or obtain information about the user from other sources that control circuitry 404 may access. As a result, a user can be provided with a unified grid guide experience across the user's different media devices.

Media device 400 and media device 401 of FIG. 4 can be implemented in system 500 of FIG. 5 as media device 502. Media devices, on which a grid guide may be implemented, may function as a standalone device or may be part of a network of devices. Various network configurations of devices may be implemented and are discussed in more detail below.

In system 500, there may be multiple media devices but only one of each is shown in FIG. 5 to avoid overcomplicating the drawing. In addition, each user may utilize more than one type of media device and also more than one of each type of media device.

As depicted in FIG. 5, media device 502 may be coupled to communication network 504. Communication network 504 may be one or more networks including the Internet, a mobile phone network, mobile voice or data network (e.g., a 4G or LTE network), cable network, public switched telephone network, Bluetooth, or other types of communication networks or combinations of communication network. Thus, media device 502 may communicate with server 506 over communication network 504 via communications circuitry described above. It should be noted that there may be more than one server 506, but only one is shown in FIG. 5 to avoid overcomplicating the drawing. The arrows connecting the respective device(s) and server(s) represent communications paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 6-10.

Figure 6:
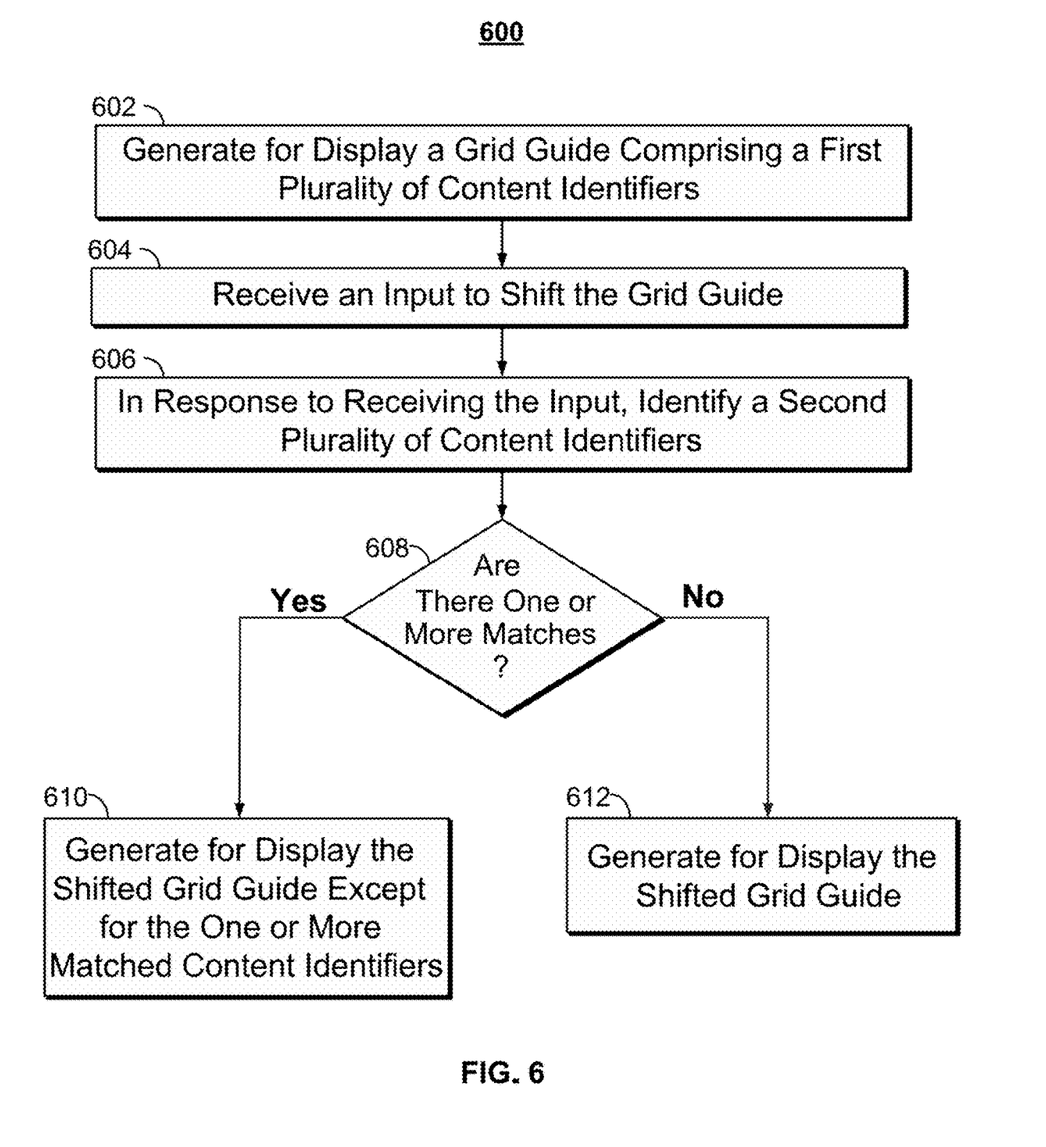
FIG. 6 is a flowchart of an illustrative process for removing duplicative content identifiers from a grid guide, in accordance with some embodiments of the present disclosure.

FIG. 6 is a flowchart of an illustrative process 600 for removing duplicative content identifiers from a grid guide, in accordance with some embodiments of the present disclosure. As shown in FIG. 6, process 600 compares content identifiers in a grid guide with content indicators associated with a user request to shift the grid guide. If there are duplicate content identifiers, the system removes the duplicative content identifiers from the grid guide before displaying the grid guide to the user. By removing duplicate content identifiers, process 600 makes it easier for the user to identify fresh content.

At step 602, the system (e.g., control circuitry 404) generates for display a grid guide. For example, the system can display the grid guide of window 102 of FIG. 1. The grid guide may be generated for display on display 412, which may be a component of a television screen, computer or laptop, smartphone, or any other display device (e.g., media device 502). In some embodiments, the grid guide may list content sources along a first axis and time slots along a second axis. In some embodiments, one axis of the grid guide may instead correspond to one or more categories of content such as genre, type of content, location of content storage, or any other category. The grid guide comprises a first plurality of content identifiers. The system may populate the grid guide with content identifiers according to linear media channel schedules, VOD content (e.g., content available from the server 506), user-selected content, downloaded content, or any other source. The content identifiers may comprise text indicating the title of the content and, additionally or alternatively, a summary of the content, actors and actresses featured in the content, directors of the content, a representative image of the content, or any other information.

At step 604, the system receives an input to shift the grid guide. In some embodiments, the input may comprise a signal from a remote control requesting a shift in the grid guide. In some embodiments, the system may receive this input via user input interface 410. For example, the system may receive a user selection of an option to shift the grid guide or a swiping input to shift the grid guide.

At step 606, in response to the input received at step 604, the system (e.g., control circuitry 404) identifies a second plurality of content identifiers. This second plurality of content identifiers corresponds to the range of the axes that are included in the shifted grid guide. For example, the grid guide of window 104 of FIG. 1 shows a second plurality of content identifiers based on a shifted grid guide. The shifted grid guide comprises a new range of values for at least one axis of the grid guide; thus, the system must populate the shifted grid guide with new content identifiers. The system may access a database (e.g., on server 506) to identify the content identifiers corresponding to the new range of values of the grid guide.

At step 608, the system (e.g., control circuitry 404) determines whether there is a match between any content identifiers of the first plurality of content identifiers and any content identifiers of the second plurality of content identifiers. If there are one or more matches, the system proceeds to step 610. If there are no matches, the system proceeds to step 612.

At step 610, the system (e.g., control circuitry 404) generates for display (e.g., via display 412) the grid guide shifted and comprising the second plurality of content identifiers except for the one or more matched content identifiers. For example, the grid guide in window 106 of FIG. 1 displays a grid guide shifted and comprising a second plurality of content identifiers except for the matched content identifiers. This display shows only fresh content without including matched identifiers. In some embodiments, if the user wishes to view all of the second plurality of content identifiers, including the matched second content identifiers, at a later time, the system may provide the user with an option or a setting to view duplicate content identifiers. At step 612, the system (e.g., control circuitry 404) generates for display the shifted grid guide comprising the second plurality of content identifiers (e.g., via display 412).

It will be understood that process 600 is merely illustrative and that various modifications can be made in accordance with the present disclosure.

Figure 7:
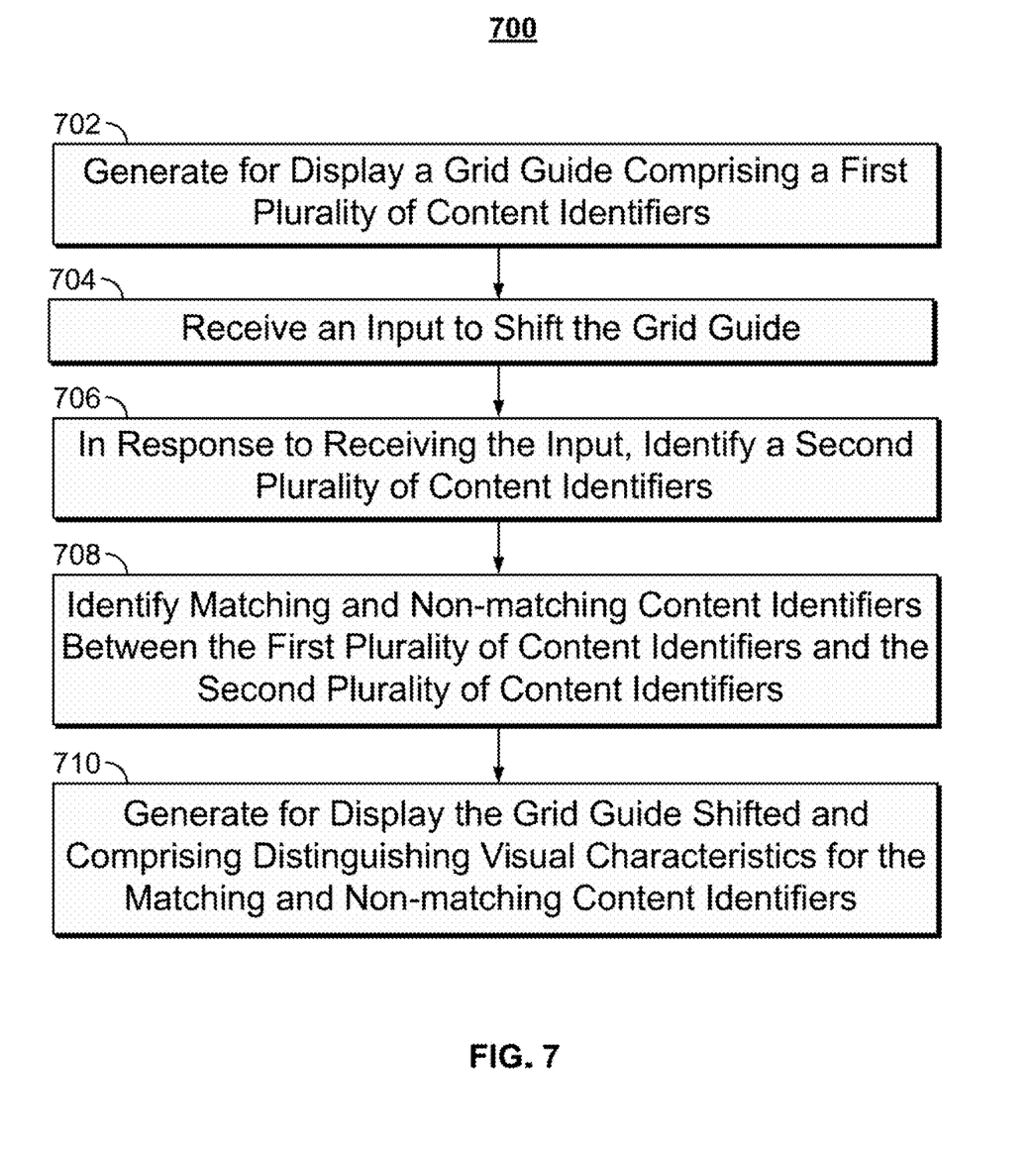
FIG. 7 is a flowchart of an illustrative process for displaying a grid guide with different display characteristics for duplicative and non-duplicative content identifiers, in accordance with some embodiments of the present disclosure.

While FIG. 6 shows a process for optimizing a grid guide by removing identifiers, other techniques may be used to draw the user's attention to fresh content. FIG. 7 is a flowchart of an illustrative process 700 for displaying a grid guide with different display characteristics for duplicative and non-duplicative content identifiers, in accordance with some embodiments of the present disclosure. As shown in FIG. 7, process 700 compares content identifiers in a grid guide with content indicators associated with a user request to shift the grid guide. If there are duplicate content identifiers, the system changes a display characteristic of the duplicative content identifiers, the non-duplicative content identifiers, or both in order to highlight the non-duplicative content identifiers. By changing a display characteristic, the system draws the user's attention to the fresh content identifiers without removing any information (i.e., content identifiers) from the grid guide.

At step 702, the system (e.g., control circuitry 404) generates for display a grid guide. For example, the system can display the grid guide of window 102 of FIG. 2. The grid guide may be generated for display on display 412, such as a television screen, computer or laptop, smartphone, or any other display device (e.g., media device 502). The grid guide comprises a first plurality of content identifiers. The system may populate the grid guide with content identifiers according to linear media channel schedules, VOD content, user-selected content, downloaded content, or any other source. The content identifiers may comprise text indicating the title of the content and additionally or alternatively a summary of the content, actors and actresses featured in the content, directors of the content, a representative image of the content, or any other information.

At step 704, the system receives an input to shift the grid guide. In some embodiments, the input may comprise a signal from a remote control requesting a shift in the grid guide. In some embodiments, the system may receive this input via user input interface 410. For example, the system may receive a user selection of an option to shift the grid guide or a swiping input to shift the grid guide.

At step 706, in response to the input received at step 604, the system (e.g., control circuitry 404) identifies a second plurality of content identifiers. This second plurality of content identifiers corresponds to the range of the axes that are included in the shifted grid guide. For example, the grid guide of window 204 in FIG. 2 shows a second plurality of content identifiers based on the shifted grid guide. The shifted grid guide comprises a new range of values for at least one axis of the grid guide; thus, the system must populate the shifted grid guide with new content identifiers. The system may access a database (e.g., on server 506) to identify the content identifiers corresponding to the new range of values of the grid guide.

At step 708, the system (e.g., control circuitry 404) identifies matching and nonmatching content identifiers between the first plurality of content identifiers and the second plurality of content identifiers. For example, the matches can be identified by comparing the first plurality of content identifiers (e.g., the content identifiers in the grid guide of window 202 of FIG. 2) to the second plurality of content identifiers (e.g., the content identifiers in the grid guide of window 204 of FIG. 2). In some embodiments, the system may prompt the user for a preferred method of highlighting non-duplicative content (e.g., during system setup). For example, the system may prompt the user to select a color of the duplicative and/or the non-duplicative content identifiers. In another example, the system may prompt the user to select a level of highlighting or opacity at which to display the duplicative or non-duplicative content identifiers. The system may prompt the user and receive a user selection in response to the prompt via user interface input 410.

At step 710, the system (e.g., via control circuitry 404) generates for display the grid guide shifted and comprising each content identifier of the second plurality of content identifiers. The displayed non-matched (i.e., non-duplicative) content identifiers comprise a display characteristic value that is different from a value of the same display characteristic of the matched (i.e., duplicative) content identifiers, and the display characteristic value of the non-matched content identifiers of the second plurality of content identifiers is the same value. For example, the display characteristic may be the color of the content identifiers and the non-matched content identifiers may all be the same color, which is different from the color of the matched content identifiers. The grid guide of window 206 of FIG. 2 illustrates matched and non-matched content identifiers having different colors in the grid guide. In some embodiments, the display characteristic may be brightness of the content identifiers, and the system may display the non-matched content identifiers at a greater brightness level than the matched content identifiers. In some embodiments, the display characteristic may be opacity of the content identifiers and the system may display the non-matched content identifiers with a greater opacity value and the matched content identifiers with a greater transparency value. In some embodiments, the display characteristic may be a graphic icon of a content identifier. For example, the system may add word art to a content identifier. In another example, the system may add an image (e.g., a star, a tomato, etc.) to the content identifier to distinguish matched content identifiers from non-matched content identifiers. The display characteristics may be any other characteristic of the content identifier, and any display characteristics may be combined.

It will be understood that process 700 is merely illustrative and that various modifications can be made in accordance with the present disclosure.

Figure 8:
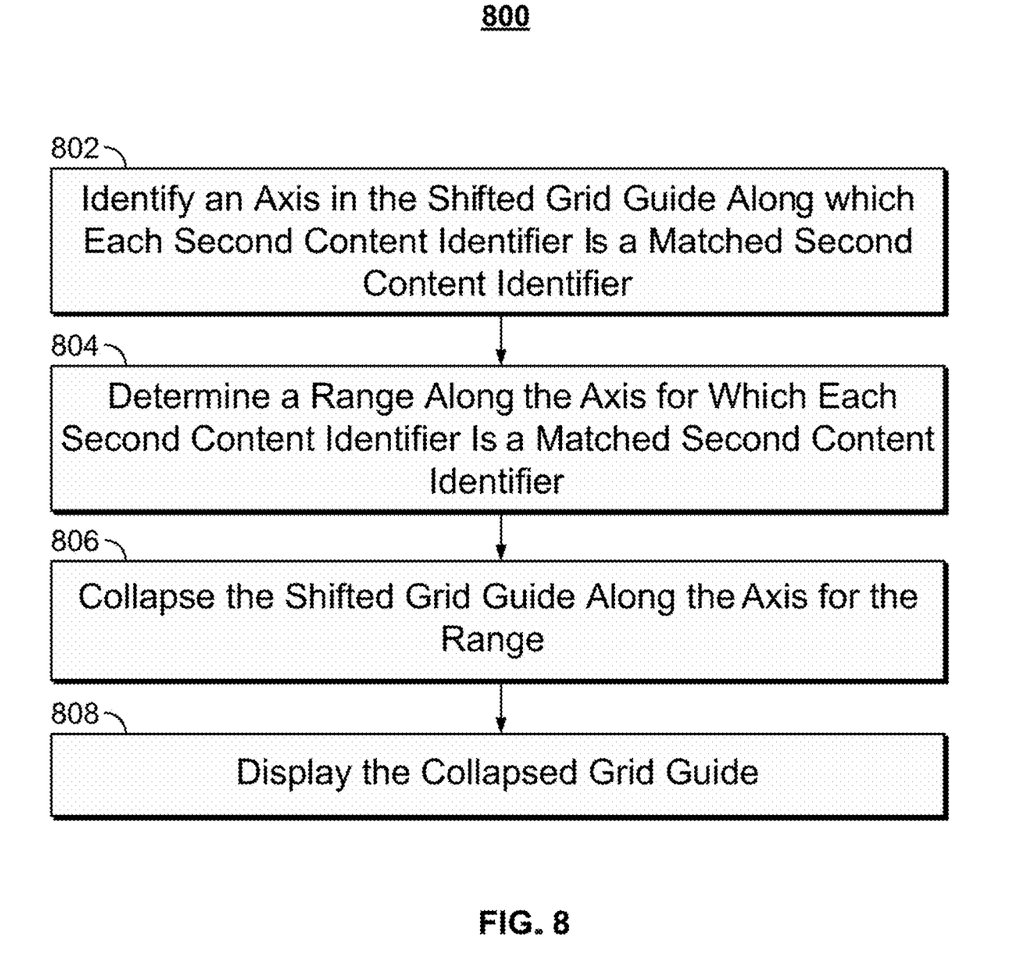
FIG. 8 is a flowchart of an illustrative process for collapsing a grid guide, in accordance with some embodiments of the present disclosure.

FIG. 8 is a flowchart of an illustrative process 800 for collapsing a grid guide, in accordance with some embodiments of the present disclosure. In some embodiments, process 800 may be performed as a continuation of step 610 of FIG. 6. As shown in FIG. 8, process 800 can collapse empty rows or columns of the grid guide after content identifiers have been removed. This method of collapsing the grid guide allows for a more efficient use of the user's display (e.g., display 412).

At step 802, the system identifies an axis in the shifted grid guide along which each second content identifier is a matched second content identifier. When the system (e.g., control circuitry 404) displays a grid guide without the matched (i.e., duplicative) content identifiers, an axis (e.g., a column or row) with only matched content identifiers appears blank on the user's display (e.g., display 412). The system may determine a single axis along which each second content identifier is a matched second content identifier or may determine that there are multiple axes along which each second content identifier is a matched second content identifier. The axes may be parallel or may intersect such that there are blank rows and columns in the grid guide.

At step 804, the system determines a range along the axis for which each second content identifier is a matched second content identifier. The system identifies a first column or row that contains only matched content identifiers. The system then determines whether the next column or row also contains only matched content identifiers. The system continues until it encounters a next column or row that contains one or more unmatched content identifiers, at which point the system determines the range of the identified blank columns or rows. The system may then repeat these steps for any other columns or rows in which each content identifier is a matched content identifier. For example, in window 106, there are two rows for which each content identifier is a matched content identifier.

At step 806, the system collapses the shifted grid guide along the columns or rows for the range. The system may remove the rows and/or columns within the ranges determined at step 804. To collapse the grid guide, the system may simply generate for display the grid guide excluding the ranges identified at step 804. The system may additionally include more information, such as rows or columns that otherwise would not have fit in the window. For example, in the grid guide of window 108, the system may be able to include content identifiers in later time slots such as 6:00 and 7:00, as well as content identifiers from additional content sources. The system generates for display a grid guide that fits the dimensions of the display device (e.g., display 412).

At step 808, the system displays the collapsed grid guide (e.g., on display 412). The system may display a grid guide that fills the display screen of the display device (e.g., display 412) or may display a collapsed grid guide that takes up only a portion of the display. Additionally or alternatively, the collapsed grid guide may expand in size to fill the entire display (e.g., display 412) on a media device.

It will be understood that process 800 is merely illustrative and that various modifications can be made in accordance with the present disclosure. It will be understood, for example, that the collapsing referred to at step 806 need not be a visual collapsing of data that was previously displayed. Rather, the collapsing can refer to the process of excluding or filtering out content when a display screen is being generated for display.

Figure 9:
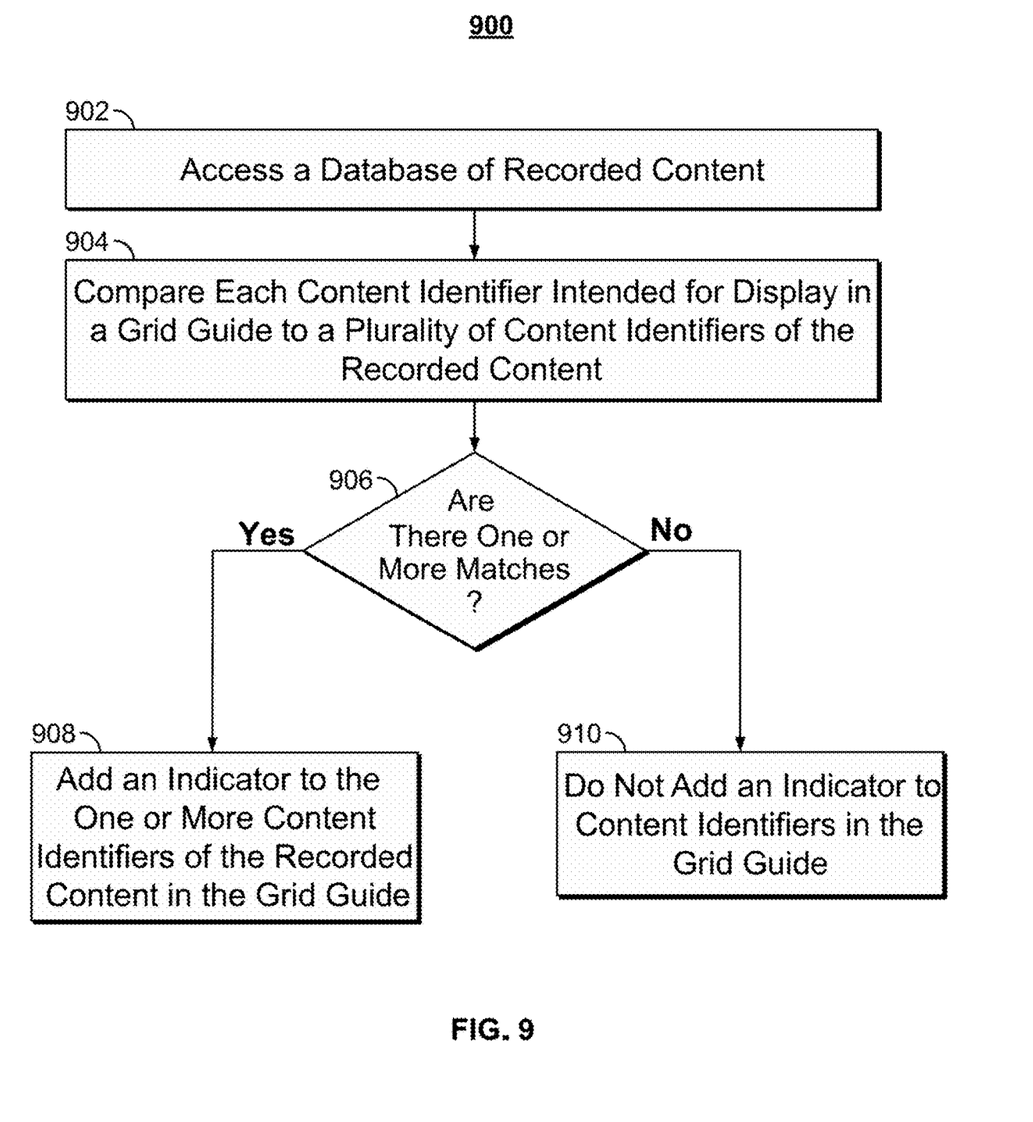
FIG. 9 is a flowchart of an illustrative process for adding an indicator to content identifiers corresponding to recorded content, in accordance with some embodiments of the present disclosure.

FIG. 9 is a flowchart of an illustrative process 900 for adding an indicator to content identifiers corresponding to recorded content, in accordance with some embodiments of the present disclosure. In some embodiments, process 900 may continue from steps 610 or 612 of FIG. 6 or from step 710 of FIG. 7. Process 900 may additionally be combined with process 800 or with process 1000, which is discussed below. Process 900 compares content identifiers in a grid guide to content that the user has recorded. If there is a match, the system adds a recording indicator to the content identifier. This facilitates the user in determining which content is readily available for viewing.

At step 902, the system (e.g., control circuitry 404) accesses a database of recorded content (e.g., on server 506). For example, the content may be recorded and saved locally on the media device (e.g., storage 408) or may be saved externally (e.g., in cloud-based storage).

At step 904, the system compares each content identifier intended for display in the grid guide to a plurality of content identifiers of recorded content. The system may compare the metadata of the recorded content to the content identifiers in the grid guide.

At step 906, the system determines whether there are one or more matches between the content identifiers intended for display in the grid guide and the content identifiers of recorded content. The system may determine that the metadata of one or more content identifiers in the grid guide corresponds to one or more recorded content items that are in a saved in a database or stored locally on the user's equipment (e.g., storage 408). If the system determines that there are one or more matches, the system continues to step 908. If there system determines that there are no matches, then the system continues to step 910.

At step 908, the system adds an indicator to the one or more matching content identifiers in the grid guide. The indicator may be any visual indicator that distinguishes the content identifier from content identifiers that do not correspond to recorded content. In some embodiments, the indicator may be an image that is added to the content identifier, such as a graphic that represents a recording or a download (e.g., indicator 208). In some embodiments, the system may add an indicator in the form of an overlay or color in the grid guide. The system may additionally or alternatively add a visual highlight to the content identifier.

At step 910, the system does not add an indicator to any content identifiers in the grid guide. In this case, process 900 does not modify the grid guide.

It will be understood that process 900 is merely illustrative and that various modifications can be made in accordance with the present disclosure.

Figure 10:
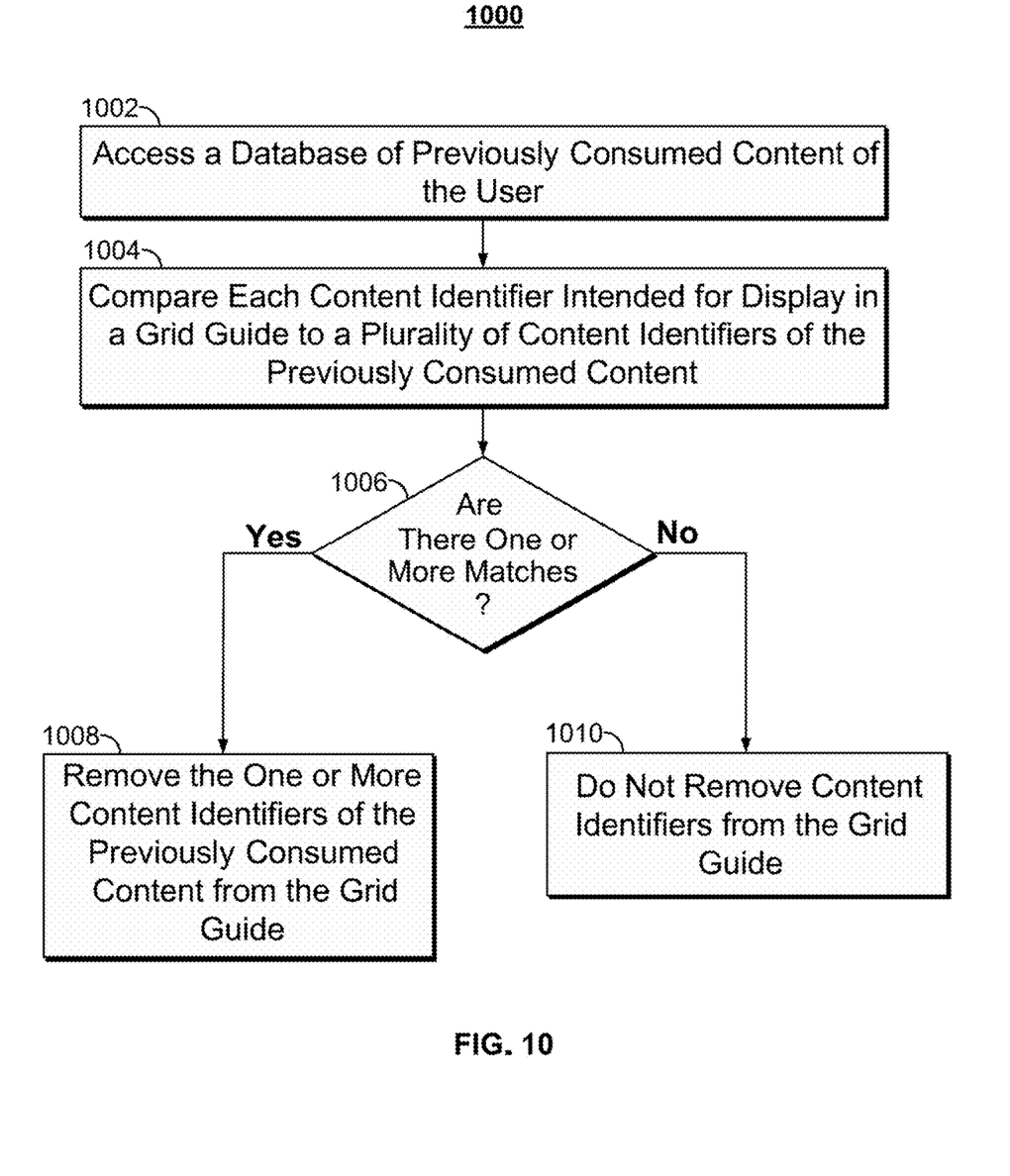
FIG. 10 is a flowchart of an illustrative process for removing content identifiers from the grid guide corresponding to previously consumed content, in accordance with some embodiments of the present disclosure.

In addition to comparing the content identifiers in the grid guide to recorded content, the system (e.g., control circuitry 404) may compare the content identifiers to previously watched or previously consumed content. FIG. 10 is a flowchart of an illustrative process 1000 for removing content identifiers from the grid guide that correspond to previously watched or previously consumed content, in accordance with some embodiments of the present disclosure. This allows the user to disregard content that the user has already seen and that therefore may be undesirable to the user. In some embodiments, process 1000 may continue from steps 610 or 612 of FIG. 6 or from step 710 of FIG. 7. Process 1000 may additionally be combined with process 800 or process 900.

At step 1002, the system (e.g., control circuitry 404) accesses a database of previously watched or previously consumed content of the user. The content may include audiovisual content (e.g., movies, television shows, etc.), visual content, audio content (e.g., music, podcasts, etc.), and other content types. The system may access a log of content that the user has consumed (e.g., watched, listened to, read, etc.) on the device (e.g., media device 400 or media device 401) or across devices (e.g., via cloud-based viewing history data).

At step 1004, the system compares each content identifier intended for display in the grid guide to a plurality of content identifiers of the previously consumed content. The system may compare the metadata of the previously consumed content to the content identifiers in the grid guide.

At step 1006, the system determines whether there is a match between one or more content identifiers intended for display in the grid guide and one or more content identifiers of the plurality of content identifiers of the previously consumed content. In some embodiments, the system may reference a log of previously consumed content. The system may then identify that one or more content identifiers in the grid guide match one or more identifiers of previously consumed content items, and the system may then continue to step 1008. If the system determines that there are no matches, then the system continues to step 1010.

At step 1008, the system removes the content identifier corresponding to the previously consumed content from the grid guide. In some embodiments, the system may then proceed or return to process 800 in order to further collapse the grid guide.

At step 1010, the system does not remove any content identifiers from the grid guide. In this case, process 1000 does not modify the grid guide.

It will be understood that process 1000 is merely illustrative and that various modifications can be made in accordance with the present disclosure. In some embodiments, system 1000 may include an additional step between steps 1006 and 1008. For example, if the system determines that there are one or more matches, the system may add an indicator (e.g., indicator 308) to the one or more content identifiers corresponding to the previously consumed content identifiers. The system may display the indicator to the user to indicate that the user has already seen the content item. Additionally or alternatively, the system may allow the user to specify whether the system should remove content identifiers corresponding to previously consumed content from the grid guide or should leave the content identifiers corresponding to the previously consumed content along with the indicators (e.g., indicator 308).

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   generating for display a grid guide;
   receiving an input to shift the grid guide; and
   generating, in response to the received input, for display a shifted grid guide including:
   comparing each content identifier of a first plurality of content identifiers of content intended for display in the grid guide to a second plurality of content identifiers of previously viewed content identifiers;
   identifying a match between a content identifier of the first plurality of content identifiers and a content identifier of the second plurality of content identifiers;
   removing, in response to the identifying, any matched content identifier from the first plurality of content identifiers to thereby produce a plurality of shifted content identifiers; and
   providing for display the plurality of shifted content identifiers.

2. The method of claim 1, wherein the comparing further comprises comparing metadata of the previously viewed content identifiers to the first plurality of content identifiers.

3. The method of claim 1, further comprising:
   identifying an axis in the grid guide along which each first content identifier is a matched content identifier; and
   determining a range along the axis for which each first content identifier is a matched first content identifier.

4. The method of claim 1, further comprising:
   collapsing the grid guide along an axis for a range; and
   displaying the collapsed grid guide.

5. The method of claim 1, wherein the grid guide comprises two perpendicular axes: a first axis corresponding to time and a second axis corresponding to a plurality of content sources.

6. A system comprising:
   a memory configured to store a list of previously viewed content identifiers; and
   a control circuitry communicably coupled to the memory, wherein the control circuitry is configured to:
   generate for display a grid guide;
   receive an input to shift the grid guide; and
   generate, in response to the received input, for display a shifted grid guide including:
   comparing each content identifier of a first plurality of content identifiers of content intended for display in the grid guide to a second plurality of content identifiers of previously viewed content identifiers;
   identifying a match between a content identifier of the first plurality of content identifiers and a content identifier of the second plurality of content identifiers;
   removing, in response to the identifying, any matched content identifier from the first plurality of content identifiers to thereby produce a plurality of shifted content identifiers; and
   providing for display the plurality of shifted content identifiers.

7. The system of claim 6, wherein the control circuitry is further configured to compare metadata of the previously viewed content identifiers to the first plurality of content identifiers.

8. The system of claim 6, wherein the control circuitry is further configured to:
   identify an axis in the grid guide along which each first content identifier is a matched content identifier; and
   determine a range along the axis for which each first content identifier is a matched first content identifier.

9. The system of claim 6, wherein the control circuitry is further configured to:
   collapse the grid guide along an axis for a range; and
   display the collapsed grid guide.

10. The system of claim 6, wherein the grid guide comprises two perpendicular axes: a first axis corresponding to time and a second axis corresponding to a plurality of content sources.

* * * * *